United States Patent
Menz et al.

[15] 3,663,235
[45] May 16, 1972

[54] PROCESS OF PREPARING MARGARINE CONTAINING DIACYGLYCEROPHATIDE

[72] Inventors: Hans-Udo Menz, Schenefeld/Hamburg; Horst Otto Adolf Trapp, Oftersheim/Ueber; Theophil Wieske, Hamburg, all of Germany

[73] Assignee: Lever Brothers Company, New York, N.Y.

[22] Filed: Apr. 13, 1970

[21] Appl. No.: 28,035

[52] U.S. Cl. ..................99/123, 99/15, 252/309, 252/312, 252/356, 260/403, 99/144
[51] Int. Cl. .................................................A23d 3/00
[58] Field of Search............260/403; 252/312, 351; 99/15, 99/123, 144

[56] References Cited

UNITED STATES PATENTS

| | | | |
|---|---|---|---|
| 2,177,983 | 10/1939 | Harris | 260/403 |
| 2,436,699 | 2/1948 | Rose | 260/403 |
| 2,629,662 | 2/1953 | Julian et al. | 260/403 X |
| 3,499,017 | 3/1970 | Davis | 260/403 |
| 3,505,074 | 4/1970 | Pardun | 99/123 X |
| 3,576,831 | 4/1971 | Davis | 260/403 |

FOREIGN PATENTS OR APPLICATIONS

| 947,157 | 2/1964 | Great Britain | 260/403 |
|---|---|---|---|

OTHER PUBLICATIONS

Chemical Abstracts, 63 (Nov. 8, 1965), 13066
Ansell et al., Phospholipids–Chemistry, Metabolism, Function, 1964, B.B.A. Library Volume 3, Elsevier: NY, p. 35

*Primary Examiner*—Joseph M. Golian
*Attorney*—Louis F. Kline, Jr., Melvin H. Kurtz and Edgar E. Ruff

[57] ABSTRACT

Aqueous fat emulsions of improved stability, especially emulsions with milk protein, contain as emulsifying agent a diacylglycerophosphatide of the structure $RCOOCH_2 \cdot CHOCOR^1 \cdot CH_2OPO_3H \cdot CH_2CH_2R^2$ where RCO and $R^1CO$ are fatty acid acyl groups together containing from eight to 32 carbon atoms, one of them having at least six and the other from two to 12 carbon atoms, and $R^2$ is a methylamino, dimethylamino, or trimethylammonium group, or an acylamino group whose fatty acid acyl residue has from two to 12 carbon atoms. Margarine is made by phase-inversion of such oil-in-water emulsions of high fat content.

3 Claims, No Drawings

PROCESS OF PREPARING MARGARINE CONTAINING DIACYGLYCEROPHATIDE

This invention is concerned with aqueous fat emulsions and their preparation.

Stable oil-in-water emulsions of high fat content, such as those from which margarine is to be made by phase-inversion without the separation of an aqueous phase, are difficult to prepare. This is especially so when the emulsions contain proteins, sodium chloride and calcium salts, and it is desired that they shall be stable at a pH range of from 2 to 8, particularly the lower pH values that are desirable on bacteriological grounds, especially when the emulsion is to be converted to margarine, and that they shall be sufficiently stable to mechanical shock to avoid premature phase-inversion.

U.S. Pat. application Ser. No. 743,956 describes the preparation of aqueous fat emulsions of high fat content, and which may contain water-soluble proteins, that are relatively stable even at low pH, using as emulsifying agents monoacylglycerophosphatides (lysophosphatides) whose acyl groups are derived from fatty acids of at least eight carbon atoms. Such monoacylglycerophosphatides are prepared by the enzymatic partial hydrolysis of phosphatides (diacylglycerophosphatides).

Crude hydrated vegetable phosphatides arising as by-products in the production of edible oils by extraction of oilseeds can be fractionated with lower alcohols such as ethanol, and the alcoholsoluble fraction, which is enriched in phosphatidylcholine, can be used as an emulsifying agent for oil-in-water emulsions as described in U.S. Pat. No. 2,849,318 and as an anti-spattering agent for margarine as described in British Pat. No. 1,118,373. However, using the naturally-available phosphatidylcholines, whose fatty acid residues are preponderantly of 16 and 18 carbon atoms, no satisfactorily stable oil-in-water emulsions of high fat content can be obtained, especially in the presence of protein and at a pH of less than 5.

It has now been found that stable oil-in-water emulsions can be obtained if unnatural diacylglycerophosphatides having certain fatty acid residues are used as emulsifying agents.

According to the present invention there is provided an aqueous fat emulsion containing as emulsifying agent a diacylglycerophosphatide of the structure RCOOCH$_2$·CHOCOR$^1$·CH$_2$OPO$_3$H·CH$_2$CH$_2$R$^2$ where each group RCO and R$^1$CO is a fatty acid acyl group, RCO and R$^1$CO together contain from eight to 32 carbon atoms, one group RCO or R$^1$CO has at least six carbon atoms, the other group RCO or R$^1$CO has from two to 12 carbon atoms, and R$^2$ is methylamino group —NHCH$_3$, a dimethylamino group —N(CH$_3$)$_2$, a trimethylammonium group —N$^+$(CH$_3$)$_3$, or an acylamino group —NHCOR$^3$, in which R$^3$CO is a fatty acid acyl group of from two to 12 carbon atoms.

Such emulsions include both oil-in-water emulsions and the water-in-oil emulsions obtained from them by phase inversion. By "fat" is meant a fatty acid triglyceride in either the liquid or the solid state, and by "oil-in-water" and "water-in-oil" emulsion is meant the type of emulsion irrespective of the state of the fat. Preferably the fat is an edible fat.

The fat used can be one that is solid or liquid at ambient temperature, and preferably where salad cream or mayonnaise is required, one that is liquid and shows no crystallization at 0°C: on the other hand where a margarine is to be prepared, the fat will be a margarine oil having the appropriate crystallizing properties. Thus the fat can be a vegetable oil such as sunflower oil, or a suitable margarine oil blend which can contain fatty acid triglycerides prepared for instance by the interesterification of such fats as coconut oil, partially-hardened rapeseed oil, palm oil, selectively-hardened groundnut oil and sunflower oil. The emulsion will contain in practice from 3 to 85 percent, preferably from 35 to 85 percent, and especially from 60 to 85 percent, of fat by weight.

Preferably the groups RCO and R$^1$CO of the diacylglycerophosphatide together contain from 12 to 24 carbon atoms. Those diacylglycerophosphatides which have two small fatty acid residues, for example dicaproylglycerophosphorylcholine, have a characteristic taste, and will in practice only be used in edible emulsions in small concentrations. An increase of the chain length of one fatty acid residue RCO or R$^1$CO to 12 or 14 carbon atoms generally results in disappearance of this characteristic taste. Preferably therefore one RCO or R$^1$CO group of the diacylglycerophosphatide has from 10 to 18, and especially from 12 to 18, carbon atoms, and preferably the other RCO or R$^1$CO group has from four to 12 carbon atoms. The acyl group of the fatty acid can be a saturated or unsaturated straight-chain fatty acid acyl group such as occurs in natural fats. Preferably the diacylglycerophosphatide is a diacylglycerophosphorylcholine.

Examples of suitable emulsifying agents are dilauroylglycerophosphorylcholine, dicaprinoylglycerophosphorylcholine, acetylpalmitoylglycerophosphorylcholine and N,N-dimethyldilauroylglycerophosphorylethanolamine.

The diacylglycerophosphatides where R$^2$ is a trimethylammonium group —N$^+$(CH$_3$)$_3$ (that is, the phosphatidylcholines) can be prepared by the acylation of lysophosphatidylcholines, which can themselves be obtained as described in U.S. Pat. Application Ser. No. 743,956, using a fatty acid chloride or anhydride whose acyl group contains from two to 12 carbon atoms. They can also be prepared by a similar acylation of glycerophosphorylcholine using a fatty acid chloride or anhydride whose acyl group contains from six to 12 carbon atoms. Glycerophosphorylethanolamine can be converted by suitable methylating agents to N—methyl— or N,N-dimethylglycerophosphorylethanolamines and glycerophosphorylcholine: these can then by acylated to give the diacylglycerophosphatide emulsifying agents.

Sufficient of the diacylglycerophosphatide emulsifying agent is used to obtain the stability required: the amount used is generally within the range of from 0.02 to 10 percent by weight of the fat: preferably from 0.1 to 2 percent is employed, especially for margarine emulsions. The diacylglycerophosphatides can be used in the presence of other phosphatides, or together with lysophosphatides, such as those described in U.S. Pat. Application Ser. No. 743,956. The diacylglycerophosphatides can also be used in combination with water- or oil-soluble nonionic emulsifying agents.

Water-soluble proteins, which contribute to the stability of the emulsions, can also be present. Proteins that are suitable are milk proteins, for instance as skim milk, casein, sodium caseinate, egg albumin and soyabean protein. The amount of protein suitable will depend upon the amount of fat present. For emulsions of particularly high fat content there can be used from 0.1 to 3 percent, and preferably from 0.25 percent to 2 percent, of protein by weight of the fat.

As the diacylglycerophosphatides employed are insensitive to alkaline earth metal ions, in making emulsions with them it is possible to use hard water or protein solutions containing calcium ions without the addition of sequestering agents.

A process of the invention is one for preparing an emulsion of the invention, in which liquid fat is emulsified with an aqueous dispersion of the diacylglycerophosphatide to produce an oil-in-water emulsion.

An oil-in-water emulsion can be made by preparing an aqueous phase in which the diacylglycerophosphatides are dissolved or dispersed, if necessary with heating, for example to above 40°C, and then emulsifying a fat phase at a temperature above its melting point into the aqueous phase, which is conveniently at the same temperature as the fat phase. The rate of fat addition is so regulated that a local excess of fat is avoided, especially when the fat content reaches above 70 percent and the viscosity of the emulsion is rising more rapidly with fat addition. An emulsion of 80 percent fat content can be prepared which has a comparatively low viscosity and is pourable even when it is of low pH. It is also generally possible to emulsify the fat into a protein-containing aqueous phase from which the diacylglycerophosphatide is absent, and then to add the diacylglycerophosphatide. An emulsion of the invention can also be made by adding the diacylglycerophosphatide emulsifying agent to a natural oil-in-water emulsion, for instance milk or cream.

The fat phase can contain as additional emulsifying agent a small quantity of a fatty acid monoglyceride, for example from 0.05 to 0.5 percent by weight, for instance as a technical mixture of fatty acid mono- and di- glycerides (mono/diglyceride) prepared by the interesterification of a fat with glycerol. Skim milk can be used as the basis of the aqueous phase, with or without added water to give a lower protein content or added milk powder or other suitable protein to provide a higher protein content. The emulsifying agents to stabilize the protein contained in the emulsion that the emulsion itself is not destabilized at the isoelectric point of the protein, and this enables the preparation of a stable emulsion whose aqueous phase has a pH value within the range of from 2 to 8. Emulsions of pH from 4 to 5 are particularly valuable. The protein-containing aqueous phase in which the emulsifying agent is present can even be acidified before emulsification with the fat phase, and the aqueous phase can contain up to 5 percent of salt. Preferably, where a low pH is required acidification of the already formed-emulsion is effected. The acidification can be effected by addition of lactic or citric acid until the required pH is achieved, or by bacterial formation of lactic acid using from 0.5 to 1 percent by weight of lactic acid culture added to the emulsion and incubating for an appropriate time. Alternatively the aqueous phase can be one prepared with sour milk.

An oil-in-water emulsion thus prepared can if required be homogenized at a suitable temperature, for instance one in the range of from 40° to 70°C. It can then be pasteurized or sterilized. Where milk-like emulsions with a relatively low fat content of from 3 to 15 percent are prepared in the first instance, these can like milk be concentrated by centrifugation to oil-i-water emulsions of from 35 to 85 percent fat content, and the separated aqueous by-product re-used for making further emulsion.

An oil-in-water emulsion of 35 to 85 percent fat content is preferably prepared and is then cooled to at least 5°C below the melting point of the fat phase. Preferably the cooled oil-in-water emulsion is worked to cause phase-inversion and produce a water-in-oil emulsion. The oil-in-water emulsions of 35 to 85 percent fat content can thus be converted to margarine of butter-like structure.

An emulsion of 35 to 60 percent margarine fat content can be cooled to from 5° to 15 °C until partial crystallization of the fat has occurred and phase-inversion then effected by working, for example by stirring or kneading. The structural changes then occurring correspond to those in the churning of cream in making butter. The inversion process, which should take only a few minutes, is complete when a part of the aqueous phase has separated, corresponding to buttermilk separation in the churning process. The water content of the margarine thus produced is generally between 12 and 18 percent. Inversion is particularly rapid when the emulsion used has a pH of from 4 to 5. The phase-inversion margarine obtained can be further worked, for example by kneading, with added water if required, to adjust the final water content. Oil-in-water emulsions of high margarine fat content, for example 80 percent can, after cooling to effect partial crystallization be converted by working directly into margarine by phase-inversion without the separation of an aqueous phase.

The cooling step can be effected by rapid cooling without mechanical working, as in a cooling drum, or by slow cooling at rest, and premature phase-inversion thus avoided. A small amount of phase-inversion cannot normally be avoided even when no mechanical working at all is applied. As partial phase-inversion processes are possible, by phase-inversion in this specification is meant a change of the continuous phase by which the specific conductivity of the product is less than $10^{-5}$ $\Omega^{-1}cm^{-1}$; preferably the specific conductivity of the phase-inversion product is less than $10^{-7}\Omega^{-1}cm^{-1}$. Margarine can thus be prepared having the consistency characteristics of butter, possessing high elasticity and plasticity, pleasantly fresh in taste and showing the fat droplet structure typical of butter when seen under the microscope.

In a further variant of the process four parts of an oil-in-water emulsion of 74 percent margarine fat content can be cooled to effect partial crystallization and mixed with one part of cooled but non-crystallized fat, and phase-inversion of the emulsion effected by working during mixing, so that a margarine is produced.

Emulsions of the invention can be prepared which are suitable as other foodstuffs or feedingstuffs, for example as salad cream and mayonnaise, where the emulsifying agents take the place of the customary egg yolk, and as calf milk, and also for use in cosmetic preparations, for example skin cream and cleansing milk. Emulsions of the invention can also be converted by spray-drying or freeze-drying to dry compositions from which emulsions can be reconstituted with water.

The invention is illustrated by the following Examples, in which temperatures are in °C.

EXAMPLE 1

Dilauroylglycerophosphorylcholine (obtained by the acylation of glycerophosphorylcholine with lauric acid anhydride, 0.6 g) was dispersed in water (25 ml) at 50°, and to the homogeneous dispersion was added skim milk (25 ml). Into the aqueous phase thus obtained was emulsified a margarine oil composition (200 g) at 70° using a turbomixer, and sufficient of an aqueous solution of a mixture of citric and lactic acids to provide a pH of 4.6 was then added. The resulting 80 percent oil-in-water emulsion (containing 0.3 percent of diacylglycerophosphatide and 0.4 percent of milk protein by weight of fat) was cooled to 8° without working; during this cooling the fat crystallized, and the cooled emulsion was finally worked for 2 minutes in a Hobart mixer, as a result of which phase-inversion occurred, giving a margarine which was a water-in-oil emulsion of high elasticity and plasticity and had an electrical conductivity of below $5\times10^{-7}\Omega^{-1}cm^{-1}$.

EXAMPLE 2

Dicaprinoylglycerophosphorylcholine (1.25 g) was dissolved in water (900 ml) and skim milk (100 ml) added. At 50° sunflower oil (332 g) was emulsified into the aqueous phase thus prepared and the resulting emulsion homogenized. The oil-in-water emulsion of 25 percent fat content obtained (containing 0.38 percent of diacylglycerophosphatide and 1 percent of milk protein by weight of fat) showed an average droplet diameter of about 2 to $3\mu$.

EXAMPLE 3

A margarine oil composition was prepared by mixing 20 parts by weight of sunflower oil and 80 parts of an interesterified fat mixture prepared from 35 parts of coconut fat, 33 parts of a partially hardened rapeseed oil (m.p. 35°), 10 parts of palm oil, 12 parts of a selectively-hardened groundnut oil (m.p. 32°) and 10 parts of sunflower oil.

An aqueous phase was prepared by mixing together bacterially acidified skim milk (100 g), fresh skim milk (550 g), water (650 g), dilauroylglycerophosphorylcholine (10 g) and the lysophosphatide mixture containing 15 percent α-monoacylglycerophosphatides by weight of Example 1 of U.S. Pat. application Ser. No. 743,956 (10 g).

A fatty acid mono/diglyceride emulsifying agent (20 g) was dissolved in the fat composition (5 kg), and the mixture heated to 60°, and the aqueous phase (1.3 kg) gradually added while the mixture was stirred to effect emulsification: the pH of the aqueous phase of the emulsion was adjusted to 4.6 and the acidified emulsion homogenized. The resulting 80 percent oil-in-water emulsion (containing 0.2 percent diacylglycerophosphatide and 0.4 percent milk protein by weight of fat) was cooled to 10° and phase-inverted by kneading to give a phase-inversion margarine possessing a butter-like consistency, high elasticity and plasticity, and having a fresh taste. Taste and physical properties were unchanged on storage for several weeks.

EXAMPLE 4

A phosphatide emulsifying agent (2 g) containing about 50 percent by weight of acetylpalmitoylglycerophosphorylcholine and which had been prepared by the acetylation of a lysolecithin concentrate was dissolved in a mixture of skim milk (100 ml) and water (100 ml) and the mixture heated to 50°. Into the aqueous phase thus prepared was emulsified a fat blend (200 g) likewise heated to 50°. The fine 50 percent oil-in-water emulsion obtained (containing 0.5 percent diacylglycerophosphatide and 1.5 percent milk protein by weight of fat) was slightly viscous and even after 24 hours storage at 60° no water or fat separation had occurred.

EXAMPLE 5

This Example describes the preparation of a mayonnaise without the customary egg yolk. An aqueous phase was prepared consisting of skim milk (22.5 g), water (22.5 g), dilauroylglycerophosphorylcholine (1.5 g), salt (4.5 g), sugar (6 g), mustard (3 g), and pepper (0.6 g). Into this aqueous phase was emulsified sunflower oil (240 g), and vinegar (15 g) containing 5 percent acetic acid was then also incorporated. The resulting mayonnaise consisting of an 82 percent oil-in-water emulsion (containing 0.6 diacylglycerophosphatide and 0.3 percent milk protein by weight of fat) showed a somewhat lower viscosity than egg yolk mayonnaise, but on storage showed good stability without any phase separation.

What is claimed is:

1. A process for preparing a margarine emulsion comprising a fat phase and an aqueous phase comprising i. dissolving in said aqueous phase an unnatural diacylglycerophosphatide emulsifying agent of the structure $RCOOCH_2 \cdot CHOCORCH_2OPO_3H \cdot CH_2CH_2R^2$ where each group RCO and $R^1CO$ is a fatty acid acyl group, RCO and $R^1CO$ together contain from eight to 32 carbon atoms, one group RCO or $R^1CO$ has at least six carbon atoms, the other group RCO or $R^1CO$ has from two to 12 carbon atoms, and $R^2$ is a methylamino, dimethylamino, or trimethylammonium group, or an acylamino group whose acyl residue is that of a fatty acid of from two to 12 carbon atoms, ii. adding to said aqueous phase a fat phase at a temperature above the melting point of said fat, avoiding a local excess of fat by regulating the rate of fat addition, iii. emulsifying said aqueous and fat phases to form an oil-in-water emulsion, iv. cooling said emulsion to a temperature at least 5°C below the melting point of said fat phase, v. working said emulsion thereby causing phase inversion and conversion to a water-in-oil emulsion, said fat phase being in the proportion of about 35 percent to about 85 percent of the total of said fat and aqueous phases, and said emulsifying agent being in the proportion of about 0.02 percent to about 10 percent by weight of said fat.

2. A process in accordance with claim 1 wherein said emulsion contains about 0.1 to about 3 percent, fat basis, of milk protein.

3. A process in accordance with claim 1 wherein said emulsion contains about 60 percent to about 85 percent of a fat phase, and wherein no aqueous phase separates.

* * * * *